(12) United States Patent
Kathe et al.

(10) Patent No.: US 11,366,044 B2
(45) Date of Patent: Jun. 21, 2022

(54) METHOD FOR OPERATING AN AUTOMATIC ANALYSIS APPARATUS

(71) Applicant: Endress+Hauser Conducta GmbH+Co. KG, Gerlingen (DE)

(72) Inventors: Ulrich Kathe, Ludwigsburg (DE);
Ulrich Rottensteiner, Stuttgart (DE);
Daniel Schweitzer, Remshalden (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 204 days.

(21) Appl. No.: 16/702,941

(22) Filed: Dec. 4, 2019

(65) Prior Publication Data
US 2020/0182755 A1 Jun. 11, 2020

(30) Foreign Application Priority Data
Dec. 5, 2018 (DE) ...................... 10 2018 131 060.9

(51) Int. Cl.
*G01N 1/38* (2006.01)
*G01N 1/18* (2006.01)
*G01N 35/10* (2006.01)
*G01N 35/00* (2006.01)

(52) U.S. Cl.
CPC ........... *G01N 1/38* (2013.01); *G01N 35/1002* (2013.01); *G01N 2035/00346* (2013.01); *G01N 2035/1032* (2013.01)

(58) Field of Classification Search
None
See application file for complete search history.

(56) References Cited

U.S. PATENT DOCUMENTS

| 2013/0149790 A1* | 6/2013 | Mennicken | G01N 1/38 436/175 |
| 2014/0356977 A1* | 12/2014 | Hanko | G01N 1/38 422/69 |

(Continued)

FOREIGN PATENT DOCUMENTS

| DE | 10312163 A1 | 11/2003 |
| DE | 60001411 T2 | 1/2004 |

(Continued)

*Primary Examiner* — Kathryn Wright
(74) *Attorney, Agent, or Firm* — Christopher R. Powers; Endress+Hauser (USA) Holding Inc.

(57) ABSTRACT

The present disclosure relates to a method for operating an automatic analysis apparatus for determining a parameter of a sample liquid, including: flushing a measurement unit of the analysis apparatus with a first volume of the sample liquid; discharging the first volume of the sample liquid into a collection container containing a waste liquid mixture; producing diluted sample liquid by mixing a second volume of the sample liquid with a dilution liquid using a dilution unit; producing a reaction mixture of at least a portion of the diluted sample liquid and at least one reagent; detecting a measured value of a measurement variable of the reaction mixture in the measurement unit; and, after detecting the measured value, discharging the reaction mixture from the measurement unit into the collection container, wherein the dilution liquid is recovered from the waste liquid mixture contained in the collection container.

20 Claims, 2 Drawing Sheets

(56) References Cited

U.S. PATENT DOCUMENTS

| | | | | |
|---|---|---|---|---|
| 2015/0168373 A1* | 6/2015 | Volker | ................... | G01N 21/27 |
| | | | | 422/68.1 |
| 2017/0285054 A1* | 10/2017 | Muz | ................. | G01N 35/00623 |
| 2017/0321505 A1* | 11/2017 | Murphy | .................. | E21B 21/01 |
| 2021/0101815 A1* | 4/2021 | Schiesser | .............. | C25B 15/081 |

FOREIGN PATENT DOCUMENTS

| | | |
|---|---|---|
| DE | 102010035171 A1 | 2/2012 |
| DE | 102016105770 A1 | 10/2017 |
| EP | 3527696 A1 | 8/2019 |

* cited by examiner

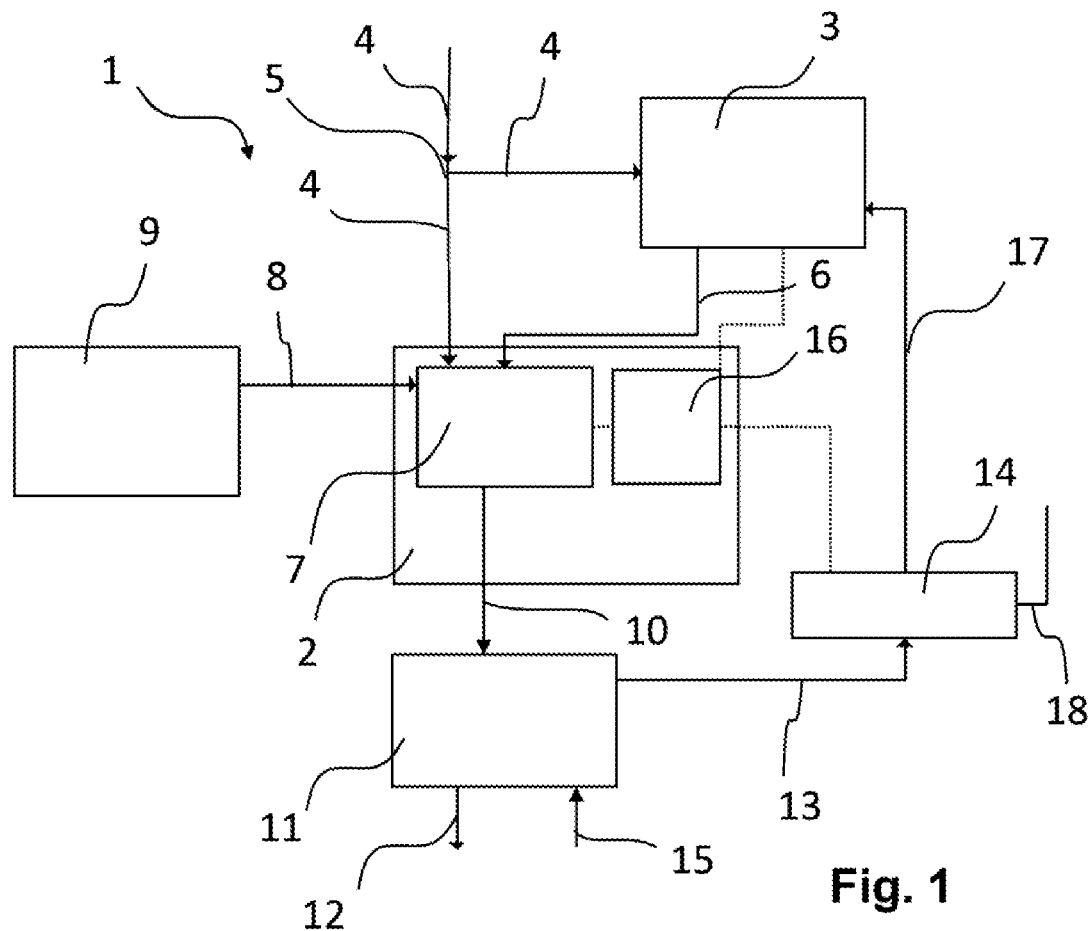
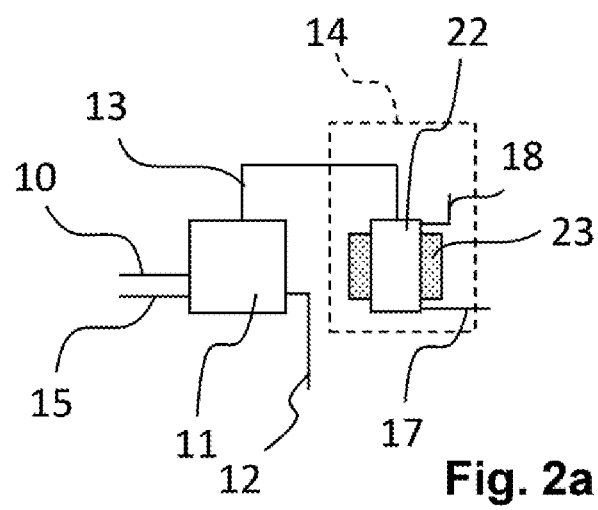
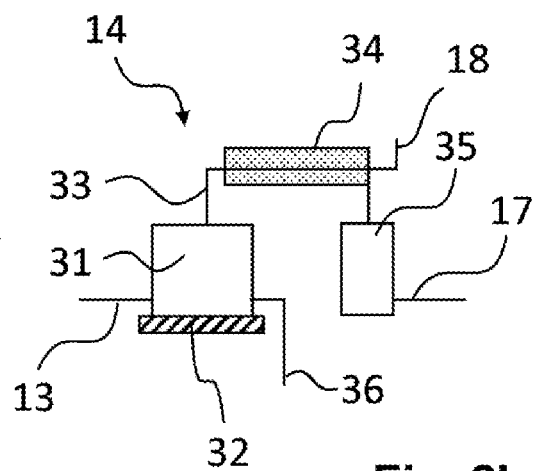
Fig. 1
Fig. 2a
Fig. 2b

METHOD FOR OPERATING AN AUTOMATIC ANALYSIS APPARATUS

CROSS-REFERENCE TO RELATED APPLICATION

The present application is related to and claims the priority benefit of German Patent Application No. 10 2018 131 060.9, filed on Dec. 5, 2018, the entire contents of which are incorporated herein by reference.

TECHNICAL FIELD

The present disclosure relates to a method for operating an automatic analysis apparatus for determining a parameter of a sample liquid, which parameter depends on the concentration of at least one analyte in the sample liquid.

BACKGROUND

In laboratory or process analysis technology, substances, for example, liquids, are analyzed qualitatively and quantitatively. In qualitative analysis, ingredients contained in a solid, gaseous, or liquid sample are identified. In quantitative analysis, a quantitative proportion, for example, a concentration, of a specific ingredient in the sample is determined. The ingredient whose proportion of the sample is determined is also referred to as an analyte. In addition to concentrations of individual analytes, it is also possible to determine sum parameters whose value depends on the proportion of a plurality of analytes in the sample. Examples of such sum parameters are chemical oxygen demand (COD), total nitrogen content (TN), or spectral absorption coefficient (SAC).

For the analysis of sample fluids in the laboratory or in process analysis technology, dilution of the sample liquids to be examined may be useful, for example, to obtain correct results even for liquids with high analyte concentrations despite a limited measuring range of a measuring device used for the analysis (e.g., a measuring probe or an automatic analysis apparatus). The sample liquid to be analyzed is diluted with a dilution liquid, for example, with water or another solvent miscible with the liquid to be analyzed.

The required degree of dilution of the sample liquid for the subsequent quantitative analysis by a measuring device can be determined by dividing the measuring range end of the measuring device by the expected concentration of the analyte in the sample liquid. The obtained result corresponds to the dilution ratio to be applied.

If such an analysis method with dilution of the sample liquid is performed routinely, for example, for long-term monitoring of an industrial process with several measurements per hour, a considerable demand for dilution medium may arise. This situation occurs, for example, in environmental metrology or in process metrology, e.g., in the field of treatment and cleaning processes in drinking water or wastewater treatment. Often used there are measuring devices which operate completely automatically and which extract a liquid sample from the process or a body of water at regular time intervals and determine one or more parameters correlating with a concentration of an analyte in the liquid sample. For detecting measured values, such measuring devices may, for example, have a measuring probe which is brought into contact with the liquid sample, or an automatic analysis apparatus. Some automatic measuring devices first produce a reaction mixture from the liquid sample by adding one or more reagents, and then carry out a measurement in the reaction mixture, for example, a measurement of the absorption or extinction of electromagnetic radiation, by means of which the value of the parameter to be monitored can be determined.

If the monitoring of a process by means of a completely automated measuring device requires a dilution of the sample liquid, a supply of dilution liquid must be made available to the measuring device. Two methods are customary for this purpose. On the one hand, the measuring device may be supplied with dilution liquid via a supply line, e.g., via a water line. If no such supply line is available, a storage container with dilution liquid may be made available to the measuring device, from which storage container the measuring device may remove a required quantity of dilution liquid by means of a pump. However, this solution is disadvantageous because the storage container requires additional space and must be regularly replaced or replenished when empty. Supply lines are not available everywhere or require a high installation and maintenance cost.

SUMMARY

The object of the present disclosure is therefore to specify a method and an analysis apparatus for determining a parameter which depends on the concentration of at least one analyte in the sample liquid, said method and analysis apparatus avoiding the cited disadvantages. The method and the analysis apparatus should especially make do without an additional supply container or a supply line for dilution liquid.

The object is achieved according to the present disclosure by a method according to claim 1 and an automatic analysis apparatus according to claim 12. Advantageous embodiments are listed in the dependent claims.

The method according to the present disclosure for operating an automatic analysis apparatus for determining a parameter of a sample liquid which depends on the concentration of at least one analyte in the sample liquid includes the following steps:

flushing at least one measurement unit of the analysis apparatus with a first volume of the sample liquid;

discharging the first volume of the sample liquid used to flush the measurement unit into a collection container containing a waste liquid mixture;

producing diluted sample liquid by mixing at least a second volume of the sample liquid with a dilution liquid by means of a dilution unit of the automatic analysis apparatus;

producing a reaction mixture of at least a portion of the diluted sample liquid and at least one reagent;

detecting a measured value of a measurement variable of the reaction mixture in the measurement unit, said measurement variable correlating with the parameter of the sample liquid that is to be determined; and after detecting the measured value, discharging the reaction mixture from the measurement unit into the collection container, wherein the dilution liquid is recovered from the waste liquid mixture contained in the collection container.

In that the dilution liquid required for diluting the second volume of the sample liquid is obtained from the waste liquid mixture contained in the collection container, an additional supply of dilution liquid, for example, via a supply line or by providing a storage container with dilution liquid, may be omitted. The method can thus be used in a simple, cost-saving, and low-maintenance manner for a plurality of different applications, especially, for automated measuring devices, e.g., in the laboratory, for monitoring a process, or in environmental metrology.

The measurement unit may, for example, comprise a measuring cell with at least one supply line and at least one discharge line, as well as a measuring transducer. The sample liquid, or the diluted sample liquid, and the reagent, or the reaction mixture, may be introduced into the measuring cell via the at least one supply line and, after the measurement, may be discharged via the discharge line into the collection container for the waste liquid mixture. The measuring transducer may be configured to detect a measured value of the measurement variable of the reaction mixture contained in the measuring cell, said measurement variable correlating with the parameter of the sample liquid that is to be determined. For example, the measuring transducer may be an optical measuring transducer, for example, a photometric or spectrophotometric measuring transducer.

In order to flush the measurement unit, the first volume of the sample liquid is conducted via the at least one supply line into the measuring cell and is discharged again via the at least one discharge line. In order to detect measured values, the diluted sample liquid and the reagent are conducted into the measuring cell either sequentially to form a reaction mixture or as a reaction mixture produced before the supply line into the measuring cell, and, after the measurement has taken place successfully, the reaction mixture is discharged via the discharge line into the collection container for the waste liquid mixture.

In an advantageous embodiment, the measurement unit can be flushed with a portion of the diluted sample liquid after the flushing with the first volume of the sample liquid and before the detection of the measured value of the measurement variable of the reaction mixture that correlates with the parameter of the sample liquid that is to be determined. This is advantageous if the sample liquid comprises the analyte in a high concentration. Without this intermediate flushing step, residues of the undiluted sample liquid that adhere after the flushing with the undiluted sample liquid can be mixed with the diluted sample liquid or the reaction mixture that is introduced later for the measurement. In case of high analyte concentrations in the undiluted sample liquid, this may lead to a significant error in the measured value determination. The measurement unit is advantageously completely emptied before flushing with the first portion of the diluted sample liquid.

The dilution liquid can be obtained from the waste liquid mixture in numerous ways by means of physical or chemical separation methods. In the following, several advantageous methods for obtaining the dilution liquid are described which can be used in the method according to the present disclosure. The method is advantageously selected such that the obtained dilution liquid is substantially free of the at least one analyte.

For example, the recovery of the dilution liquid from the waste liquid mixture may include a membrane method, for example, nanofiltration or reverse osmosis, in which the dilution liquid, for example, water, is separated from the waste liquid mixture.

In an alternative method, the recovery of the dilution liquid from the waste liquid mixture may include condensing vapor obtained from the waste liquid mixture. If water is to be obtained as dilution liquid, water vapor is discharged from the waste liquid mixture and condensed accordingly in this method.

Obtaining the dilution liquid from the waste liquid mixture can include distillation or fractional distillation of at least a portion of the waste liquid mixture. In one variant, the distillate or an analyte-free fraction of the distillation may serve as dilution liquid. It is also possible that the residue of the distillation serves as dilution liquid which no longer contains the analyte, for example, if the analyte is more readily volatile than the solvent in which the analyte is dissolved.

In a further variant, obtaining the dilution liquid from the waste liquid mixture may include the following steps:

introducing a gas into at least a portion of the waste liquid mixture;

discharging the gas, enriched with vapor from the waste liquid mixture, from the collection container; and condensing vapor contained in the discharged gas.

If the sample liquid contains water in which the analyte is present in dissolved or suspended form, the vapor discharged with the gas may be water vapor. Water which can be used as dilution liquid is accordingly obtained by condensing the water vapor.

If water vapor is contained in the discharged gas, this may be separated from the gas by means of a membrane dryer and may subsequently be condensed. The condensate is then available as dilution liquid.

Optionally, the gas may be heated prior to being introduced into the waste liquid mixture. Alternatively or additionally, the waste liquid mixture may be heated during the introduction of the gas.

In an advantageous embodiment, all method steps are performed in an automated manner by means of measuring and control electronics of the analysis apparatus. To this end, the measuring electronics may control valves and pumps for transporting and metering liquids, possibly existing heating and cooling elements for obtaining the dilution liquid from the waste liquid mixture, and the measurement unit for detecting measured values.

The automatic analysis apparatus according to the present disclosure for determining measured values of a parameter dependent on the concentration of at least one analyte in a sample liquid comprises:

a sample liquid line that can be fluidically connected with a sampling point containing the sample liquid;

a dilution unit that can be fluidically connected with the sample liquid line and a supply line for dilution liquid, and that is designed to dilute sample liquid supplied via the sample liquid line to the dilution unit with the dilution liquid;

at least one liquid container containing a reagent;

a measurement unit arranged downstream of the dilution unit;

means for transporting the diluted sample liquid and the reagent to the measurement unit, and for producing a reaction mixture of the diluted sample liquid and the reagent, wherein the measurement unit is designed to generate a measurement signal representing a measurement variable of the reaction mixture, said measurement variable being correlated with the parameter to be determined;

a collection container, which is arranged downstream of the measurement unit and contains a waste liquid mixture, for spent liquids discharged from the measurement unit; and a separating device fluidically connected with the collection container, which separating device serves to obtain a dilution liquid from the waste liquid mixture contained in the collection container, wherein the separating device can be fluidically connected with the dilution unit in order to supply dilution liquid thereto.

The measurement variable that is correlated with the parameter to be determined may, for example, be an absorption or extinction of electromagnetic radiation, for example, in the UV/Vis or IR wavelength range. In this case, in order to detect the measurement variable, the measurement unit comprises a measuring cell with mutually opposing wall regions transparent to the measuring radiation, as well as a radiation source and a radiation receiver, which are arranged with respect to the transparent wall regions of the measuring cell such that radiation emitted by the radiation source passes through the measuring cell and subsequently strikes the radiation receiver. The radiation receiver is designed to generate and output the measurement signal representing the measurement variable as a function of the received radiation intensity. The measuring cell has at least one inlet that is fluidically connected with the dilution unit, the sampling point, and the liquid container containing the reagent. Moreover, it has at least one outlet fluidically connected with the collection container.

The means for transporting the diluted sample liquid and the reagent to the measurement unit, and for producing a reaction mixture of the diluted sample liquid and the reagent, may comprise liquid lines, one or more pumps, and one or more valves. The pumps and valves may, in cooperation, serve for transporting and metering the sample liquid of the reagent. In order to meter the reagent and the sample liquid, the analysis apparatus may also comprise a dosing unit which, for example, may be formed from a vessel having one or more fill level detectors, for example, photoelectric barriers. Such a dosing unit is known from DE 10 2016 105 770 A1, for example. In order to mix the sample liquid with the dilution medium, and/or to mix the diluted sample liquid with the reagent, the analysis apparatus may have at least one mixing container in which the components to be mixed may be combined via liquid supply lines, and which can be fluidically connected with the measuring cell.

The automatic analysis apparatus may have a fluid line connecting the collection container with the separating device. In one possible embodiment, the fluid line may serve to conduct a portion of the waste liquid mixture from the collection container into the separating device. A separation method for obtaining dilution liquid from the supplied waste liquid mixture, for example, a membrane process or a distillation, may then be carried out in the separating device.

In another embodiment, the automatic analysis apparatus may have a gas supply line opening into the collection container. In this embodiment, the fluid line connecting the collection container with the separating device may serve to conduct vapor-enriched gas, which has been discharged from the collection container, to the separating device in order to obtain the dilution medium there, for example, by condensation of the vapor. The vapor may be a solvent vapor, for example, water vapor.

The separating device may have a cooler for cooling gas supplied from the separating device via the fluid line, and a condensate container for collecting condensate from the cooled gas, wherein the condensate container can be fluidically connected to the dilution unit in order to supply the condensate thereto as dilution liquid.

The gas supply line opening into the collection container, and/or the collection container, may be heatable to improve the yield of dilution liquid from the gas.

In one possible embodiment, the separating device may comprise the following components:

a heatable container fluidically connected with the collection container, and a heater interacting with the heatable container to heat collection liquid transported into the container from the collection container, and a condensation unit, wherein the condensation unit has a cooler for cooling a gas exiting the heatable container and a condensate container arranged downstream of the heatable container to collect condensate from the cooled gas.

The condensate container may be fluidically connected with the dilution unit in order to supply the latter with condensate collected in the condensate container as dilution liquid.

BRIEF DESCRIPTION OF THE DRAWINGS

The present disclosure is described in more detail in the following with reference to the exemplary embodiments illustrated in the figures, as follows:

FIG. 1 shows a schematic of an automatic analysis apparatus having a separating device for obtaining dilution liquid from a waste liquid mixture that is collected in a collection container of the analysis apparatus;

FIG. 2a shows a schematic of the separating device of the analysis apparatus according to FIG. 1, according to a first exemplary embodiment;

FIG. 2b shows a schematic of the separating device of the analysis apparatus according to FIG. 1, according to a second exemplary embodiment.

DETAILED DESCRIPTION

Figure 2C:
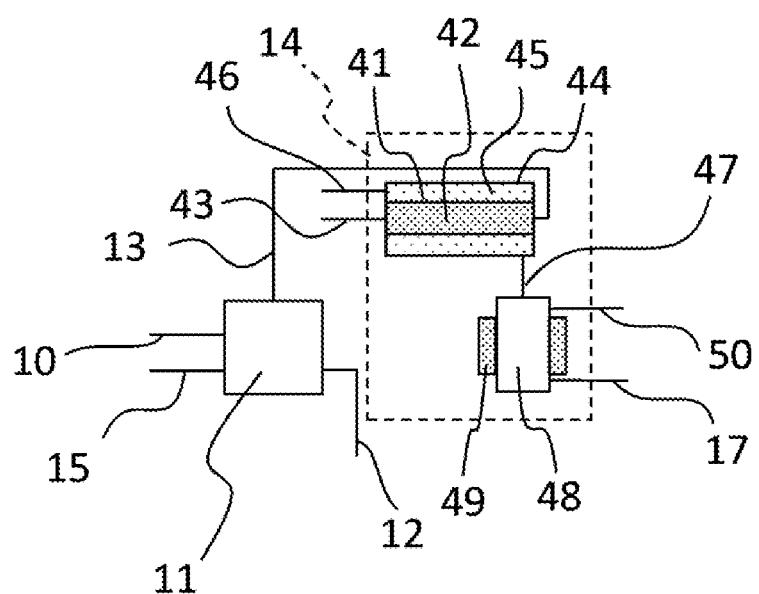
FIG. 2c shows a schematic of the separating device of the analysis apparatus according to FIG. 1, according to a third exemplary embodiment.

FIG. 1 schematically shows an automatic analysis apparatus 1 with a measurement unit 2 and a dilution unit 3, upstream of the measurement unit 2, for dilution of a sample liquid taken from a sampling point via the sample line 4. The sample line 4 can additionally be connected directly with the measurement unit 2 via a branch 5 in order to supply undiluted sample liquid to the measurement unit 2. The dilution unit 3 is connected via a further liquid line 6 with the measurement unit 2, which serves to supply diluted sample liquid to the measurement unit 2.

The sampling point may, for example, be an open body of water, a basin of a water treatment or clarification plant, or a process container of a process engineering process. The measurement unit 2 serves to determine values of a parameter that depends on the concentration of at least one analyte contained in the sample liquid. The parameter may, for example, be a concentration of a single analyte, for example, an ion type or an organic substance. The parameter may also be a sum parameter to the value of which a plurality of analytes contributes, for example, the spectral absorption coefficient SAC, total nitrogen content TN, chemical oxygen demand CSB or COD, or total carbon content (TC). In the present example, the sample liquid is a water-based solution or mixture (e.g., suspension, dispersion, and/or emulsion). However, the device described herein and the method described further below can also be used for dilution and analysis of sample liquids based on solvents other than water.

In the present example, the measurement unit 2 comprises a measuring cell 7 which is fluidically connected with the sample line 4, with the liquid line 6 coming from the dilution unit 3, and with a further liquid line 8. The further liquid line 8 connects a storage container 9 with the measuring cell 7. The storage container 9 contains a reagent which is intended to be mixed with the diluted sample liquid to form a reaction mixture. The reagent undergoes a chemical reaction with the analyte, which reaction leads to the formation of a reaction product, for example, a colored reaction product, which can be detected with optical means. In one variant, the measurement unit 2 can be designed to produce the reaction mixture directly in the measuring cell 7. Alternatively, the measurement unit 2 may have a mixing device upstream of the measuring cell 7 for producing the reaction mixture (not shown here).

In the exemplary embodiment described here, the measuring cell 7 has an optical measuring transducer, for example, a photometer or a spectrophotometer, which serves to detect measured values representing the parameter to be determined. For example, the measuring transducer may have one or more radiation sources, for example, one or more LEDs, as well as one or more radiation receivers, for example, one or more photodiodes, a photodiode panel, or a CCD panel. The radiation source(s) and radiation receivers are arranged opposite one another in such a way that measuring radiation emitted by the radiation source(s) passes through the reaction mixture received in the measuring cell and subsequently strikes the radiation receiver(s). The radiation receiver is designed to output measurement signals which are dependent on the intensity of the received radiation and which represent an absorption or extinction of the measuring radiation in the reaction mixture.

The measuring cell 7 moreover has a liquid outlet 10 which opens into a collection container 11 for a waste liquid mixture. All or individual liquids conducted through the measuring cell 7 may be discharged into this collection container 11. The collection container 11 has a discharge line 12 via which the waste liquid mixture can be removed from time to time in order to supply it to a disposal. The collection container 11 is moreover connected with a separating device 14 via a fluid line 13. An optionally present gas supply line 15 may moreover open into the collection container 11, via which gas supply line 15 gas can be introduced into the collection container 11 in order to, with the gas, discharge water vapor from the collection container 11 into the separating device 14 via the fluid line 13. In a modification of the analysis apparatus, the gas supply line 15 may be absent and the fluid line 13 may be used to supply a portion of the liquid waste liquid mixture to the separating device 14 in order to separate dilution liquid from the waste liquid mixture in said separating device 14.

In the present exemplary embodiment, the separating device 14 is designed to condense the water vapor contained in the gas supplied to it. For this purpose, it comprises a cooler and a condensate container for collecting condensate formed from the gas. The gas is discharged from the separating device 14 via an outlet 18.

The separating device 14 is fluidically connected with the dilution unit 3 via a further liquid line 17. The condensate collected in the condensate container of the separating device 14 may serve as dilution liquid for sample liquid taken from the sampling point and be supplied to the dilution unit 3 via the liquid line 17. The dilution unit 3 has a storage container (not shown in more detail in FIG. 1) for the dilution liquid, into which storage container the condensate is first introduced via the liquid line 17. The dilution is carried out completely automatically by the dilution unit 3. For this purpose, it has means for metering and mixing the sample liquid and the dilution liquid, e.g. liquid lines and one or more pumps and valves, with which sample liquid and dilution liquid are taken from the sampling point and the storage container for dilution liquid as required and are mixed in a predetermined mixing ratio. For mixing, the dilution unit may comprise a mixing container, for example, a container with a stirrer, or a liquid line with a corresponding shape or structuring, which lead to swirling of the two liquids to be mixed. At least a portion of the diluted liquid sample thus produced may be supplied to the measurement unit 2 via the liquid line 6.

The analysis apparatus 1 may also be designed to supply the dilution liquid, optionally or at fixed time intervals, from the dilution unit 3 to the measuring cell 7 without the addition of sample liquid. This allows the implementation of zero measurements, i.e. the detection by means of the measurement unit 2 of a measured value which represents a zero point of the analysis apparatus 1. Such a zero measurement may be used to calibrate and/or adjust the analysis apparatus 1.

The analysis apparatus has suitable controllable means for transporting and dosing liquids and/or gases, e.g. pumps and valves. In order to fully automatically perform the dilution of the sample liquid and the detection of measured values of the measurement variable, the measurement unit in the present example moreover has a measuring and control electronics 16. This measuring and control electronics 16 is connected with the measuring cell 7, for example, with the measuring transducer of the measuring cell 7, in order to detect and process its measurement signals. For this purpose, the measuring and control electronics 16 has a memory with a measurement program stored therein and is designed to execute the measurement program in order to derive measured values of the parameter from the measurement signals and output them.

The measuring and control electronics 16 is moreover connected with the separating device 14, the dilution unit 3, and the measuring cell 7, as well as with the pumps and valves of the automatic analysis apparatus 1 which serve for transporting and metering liquids. An operating program for controlling the analysis apparatus 1 is stored in the memory of said analysis apparatus 1 and is designed to execute the operating program in order to control the pumps and valves of the analysis apparatus 1, and to meter and transport liquids according to the operating program, and to completely automatically carry out the recovery of the dilution liquid from the waste liquid mixture contained in the collection container 11 and the dilution of the sample liquid with the dilution liquid. Part of the electronics controlling the dilution of the sample liquid may be stored in the dilution unit 3 as on-site electronics.

An example of a method for determining the parameter of the sample liquid by means of the automatic analysis apparatus 1 is described below. All steps are carried out in an automatically controlled manner by the measuring and control electronics 16.

In a first step, sample liquid is taken from the sampling point via the sample supply line 4 and is flushed through the measuring cell 7 via the liquid outlet 10 into the collection container 11. There, the sample liquid forms a waste liquid mixture with liquid already present in the collection container from earlier measurement cycles.

In a second step, a gas or gas mixture, for example, nitrogen or air, is introduced into the collection container 11 via the gas supply line 15. Advantageously, the gas or gas mixture is conducted through the waste liquid mixture. The gas or gas mixture leaves the collection container 11 again via the fluid line 13 and is enriched with water vapor from the waste liquid mixture in the process. The gas enriched with water vapor arrives in the separating device 14 via the fluid line 13 and is cooled there by means of the cooler. The condensate that is formed in the process and that essentially consists of water and is free of the analyte to be detected by means of the analysis apparatus, arrives in the condensate container of the separating device 14 and serves as dilution liquid for the sample liquid.

In an alternative method variant, waste liquid mixture may be conducted from the collection container 11 into the separating device 14 via the fluid line 13 in the second step. In the separating device, the dilution liquid is then separated from the waste liquid mixture, for example, by distillation or fractional distillation, or by a membrane method, for example, filtration or reverse osmosis.

In a third step, the dilution liquid obtained in the second step is transported into the dilution unit 3 via the liquid line 17.

In a fourth step, sample liquid is transported from the sampling point into the dilution unit 3 via the liquid line 4. In the dilution unit 3, the sample liquid and the dilution liquid are mixed with one another in a certain mixing ratio predetermined by the measuring and control electronics 16 in order to thus produce a diluted sample liquid.

The second to the fourth step may be carried out after the first step (the flushing step) or independently thereof, for example, during the flushing step or during the measurement carried out later.

In a fifth step which is carried out subsequently to the first step, the flushing of the measuring cell 7, a portion of the diluted sample liquid is flushed via the line 6 through the measuring cell 7 and via the line 10 into the collection container 11. This step is optional. It is advantageous if the sample liquid has very high analyte concentrations.

In an advantageous method variant, the measuring cell 7 is first completely emptied before the fifth step. If the emptying of the measuring cell 7 before the flushing with the portion of the diluted sample liquid is omitted, the volume of the portion of the diluted sample liquid that is used for flushing the measuring cell 7 is advantageously selected to be correspondingly larger in order to ensure that the diluted sample liquid remaining in the measuring cell 7 after flushing does not have a higher analyte concentration than the diluted sample liquid introduced into the measuring cell for measurement in the following step.

In a sixth step, a further portion of the diluted sample liquid is conducted via the line 6 into measuring cell 7 and mixed there with a predetermined quantity of the reagent conducted from the storage container 9 into the measuring cell via the line 8. In variants of the method, a plurality of reagents from a plurality of storage containers may be added to the diluted sample liquid. Alternatively, the reaction mixture may also be produced in a separate container, and the reaction mixture may then subsequently be conducted into the measuring cell 7. In the formed reaction mixture, due to a chemical reaction of the analyte(s) with the reagent, a reaction product is produced which can be detected by means of the photometric or spectrometric measuring transducer. For example, the reaction product may have a coloration which leads to a characteristic extinction or absorption of measuring radiation in the visible wavelength range.

In a seventh step, the extinction or absorption of measuring radiation in the reaction mixture is detected in the measuring cell by means of the photometric or spectrometric measuring transducer, and a value of the parameter is determined on the basis of the measurement signal of the radiation detector, which measurement signal is a measure of the concentration of the reaction product in the reaction mixture. For example, this may take place using a calibration table or calibration function stored in a memory of the measuring and control electronics 16, taking into account the dilution factor with which the sample liquid was diluted.

The calibration table or calibration function associates measurement signal values with values of the measurement variable.

In an eighth step, the consumed reaction mixture is discharged from the measuring cell 7 into the collection container 11.

The described method may be repeated cyclically multiple times.

FIGS. 2a, 2b, and 2c schematically illustrate three exemplary embodiments of the separating device 14 of the analysis apparatus.

In FIG. 2a, the collection container 11 of the analysis apparatus 1 shown in FIG. 1 and the separating device 14 are schematically shown again in a somewhat more detailed manner. Like reference numerals designate like components of the analysis apparatus 1 shown in FIG. 1. The liquid outlet 10 of the measuring cell 7, the gas supply line 15, and a discharge line 12 for disposal of the waste liquid mixture in the collection container 11 open into said collection container 11. The collection container 11 is connected with a condensate container 23 of the separating device 14 via the fluid line 13. At least a portion of the wall of the condensate container 23 is in contact with a cooler 22, for example, a Peltier cooler, a heat pipe, or a fluid cooling system. The condensate container 23 moreover has a liquid discharge line 17 which is or can be fluidically connected with the dilution unit 3. The condensate container 23 may, for example, be configured as a container or as a pipeline section. As described, by supplying gas into the collection container 11, water vapor can be discharged from the waste liquid mixture and supplied via the fluid line 13 to the condensate container 23, where water condenses out due to the lower temperature of the condensate container 23 and is available as dilution liquid. The gas introduced into the condensate container 23 and cooled is discharged from the condensate container 23 again via the discharge line 18. Over several measurement and dilution cycles, the residue remaining in the collection container 11 is increasingly concentrated and should therefore be discharged from time to time via the line 12. Optionally, a heater may be provided for the gas supply line 15 or for the collection container 11.

According to a second exemplary embodiment according to FIG. 2b, the separating device 14 comprises a distillation apparatus. In the example shown here, this distillation apparatus has a heatable vessel 31, for example, a container or a pipeline section, whose wall is at least partially in contact with a heater 32, for example, a resistance heater. The vessel 31 is fluidically connected via the fluid line 13 with the collection container 11 (cf. FIG. 1) for the waste liquid mixture. A portion of the waste liquid mixture that is present in the collection container 11 may be supplied to the vessel 31 via the fluid line 13. The waste liquid mixture in the vessel 31 may be heated to boiling by means of the heater 32. The vessel 31 also has a discharge line 33 for gas and for vapor formed from the heated waste liquid mixture. This discharge line 33 is in contact, at least in one section, with a cooler 34, for example, a Peltier cooler, a heat pipe, or a fluid cooling system (liquid or air). Arranged downstream of the cooled section of the discharge line 33 is a condensate container 35, for example, a container or a pipeline section, for receiving liquid condensed out of the cooled vapor. The cooled vapor is discharged via a discharge line 18 from the cooled section of the discharge line 33 and is thus separated from the condensate. The condensate container 35 can be fluidically connected to the dilution unit 3 via the discharge line 17. The vessel 31 has a discharge line 36 via which the distillation bottom remaining in the vessel 31 may be discharged.

In this embodiment, the separating device 14 may, for example, be used for sample liquids on an aqueous basis, for example, water, waste water and drinking water samples. In this embodiment of the separating device 14, water may be separated from the other components of the sample liquid by distillation and subsequent condensation and be used as dilution liquid. In this case, the analyte remains in the residue of the distillation, i.e. in the vessel 31. In a modification, the separating device may also be designed to carry out fractional distillation with a plurality of condensate containers for the different fractions.

According to the third exemplary embodiment schematically illustrated in FIG. 2c, as in the first exemplary embodiment (FIG. 2a), the collection container 11 has a gas supply line 15 via which gas can be introduced into the waste liquid mixture in order to discharge water vapor. As in the first exemplary embodiment, the collection container 11 moreover has a liquid line 10 connected to the measuring cell 7 to supply consumed liquids to the waste liquid mixture, and a liquid discharge line 12 via which waste liquid mixture remaining in the collection container 11 may, from time to time, be discharged for disposal. The collection container is connected with the separating device 14 via the fluid line 13. The fluid line 13 opens into a space 42 surrounded by a separating membrane 41 which is tubular in the example described here, said space 42 having a gas discharge line 43. The separating membrane 41 is enclosed by a tubular housing 44 so that an annular space 45 is formed between the separating membrane 41 and the tubular housing 44, into which space 45 a gas supply line 46 opens. The annular space 45 is moreover connected with a condensate container 48 via a discharge line 47. The condensate container 48 is in contact with an optionally present cooling system 49 and has a further gas discharge line 50 and a liquid discharge line 17. The liquid discharge line 17 can be fluidically connected to the dilution unit 3 of the analysis apparatus 1. As in the previous exemplary embodiments, the condensate container 35 may, for example, be a vessel or a pipeline section.

The separating membrane 41 is configured to allow water to pass, whereas other molecules are retained by the separating membrane. In order to separate water from the gas flow discharged from the collection container 11 via the fluid line 13, dry carrier gas is conducted into the annular space 45 via the gas supply line 46. The carrier gas is preferably conducted through the annular space 45 in a flow direction opposite to the flow direction of the gas flow from the fluid line 13 through the space 42 into the gas discharge line 43, as in the exemplary embodiment shown here. In an alternative embodiment, it is however also possible that both gas flows flow in the same direction. Water vapor passes from the space 42 into the annular space 45 via the separating membrane 41 and is transported from there with the carrier gas via the discharge line 47 into the condensate container 48, whereas the substances retained by the separating membrane 41 are discharged via the gas discharge line 43 from the space 42 surrounded by the separating membrane 41. The condensate container 48 is cooled by means of the cooler 49 in order to condense water out of the carrier gas. The condensate is collected in the condensate container 48. The water thus obtained may be passed to the dilution unit 3 as dilution liquid via the liquid discharge line 17. The carrier gas exits via the gas discharge line 50. In one variant, the device may also be operated without introducing a carrier gas flow. In this case, water diffuses through the separating membrane 41 and is present as water vapor in the adjacent annular space 45. By means of a pump, the water vapor may then be transported into the condensate container 48, and the water condensed there can be obtained as dilution liquid.

This exemplary embodiment is also particularly well suitable for obtaining water as dilution liquid from the waste liquid mixture. Nafion™, for example, can be considered as a material for the separating membrane 41. A multitude of further variants and exemplary embodiments of the present disclosure are conceivable.

The invention claimed is:

1. An automatic analysis apparatus for metrologically monitoring an environmental or industrial process by determining measured values of a parameter dependent on the concentration of at least one analyte in a sample liquid, the analysis apparatus comprising:
    a sample liquid line configured to be fluidically connected with a sampling point containing the sample liquid, wherein the sampling point is fluidically connected to the process to be monitored;
    a dilution unit fluidically connected to the sample liquid line and a supply line for a dilution liquid, the dilution unit configured to dilute sample liquid supplied to the dilution unit via the sample liquid line with the dilution liquid from the supply line;
    at least one liquid container containing a reagent;
    a measurement unit disposed downstream of and fluidically connected to the dilution unit, wherein the at least one container is fluidically connected to the measurement unit;
    a means for transporting the diluted sample liquid and the reagent to the measurement unit and for producing a reaction mixture of the diluted sample liquid and the reagent, wherein the measurement unit is configured to generate a measurement signal representing a measurement variable of the reaction mixture, the measurement variable correlated with the parameter to be determined;
    a collection container disposed downstream of and fluidically connected to the measurement unit and containing a waste liquid mixture from the measurement unit; and
    a separating device fluidically connected with the collection container via a fluid line, the separating device configured to generate the dilution liquid from the waste liquid mixture contained in the collection container, wherein the separating device is fluidically connected with the dilution unit as to supply dilution liquid to the dilution unit.

2. The analysis apparatus of claim 1, further comprising a gas supply line in communication with the collection container.

3. The analysis apparatus of claim 2, wherein the gas supply line and/or the collection container can be selectively heated.

4. The analysis apparatus of claim 1, wherein the separating device comprises:
    a cooler for cooling gas supplied from the separating device via the fluid line; and
    a condensate container configured for collecting condensate from the gas cooled by the cooler, wherein the condensate container is fluidically connected to the dilution unit as to supply the condensate to the dilution unit as the dilution liquid.

5. The analysis apparatus of claim 1, wherein the separating device comprises:

a heatable container fluidically connected to the collection container;

a heater interacting with the heatable container to heat collection liquid transported into the heatable container from the collection container; and a condensation unit, wherein the condensation unit includes a cooler configured for cooling a gas discharged from the heatable container and a condensate container disposed downstream of the heatable container and configured to collect condensate from the cooled gas.

6. The analysis apparatus of claim 5, wherein the condensate container is fluidically connected with the dilution unit as to supply the dilution unit with condensate collected in the condensate container as dilution liquid.

7. The analysis apparatus of claim 1, wherein the dilution liquid includes water substantially free of the at least one analyte.

8. The analysis apparatus of claim 1, further comprising measuring and control electronics configured to operate the analysis apparatus automatically.

9. A method for operating an automatic analysis apparatus configured for metrologically monitoring of an environmental or industrial process by determining a parameter of a sample liquid which depends on the concentration of at least one analyte in the sample liquid, the method comprising:

providing the analysis apparatus of claim 1;

flushing the measurement unit of the analysis apparatus with a first volume of the sample liquid;

discharging the first volume of the sample liquid from the measurement unit into the collection container containing the waste liquid mixture;

producing diluted sample liquid by mixing at least a second volume of the sample liquid with the dilution liquid using the dilution unit;

producing a reaction mixture of at least a portion of the diluted sample liquid and at least the reagent from the at least one liquid container;

detecting a measured value of a measurement variable of the reaction mixture in the measurement unit, the measurement variable correlated with the parameter of the sample liquid that is to be determined; and after detecting the measured value, discharging the reaction mixture from the measurement unit into the collection container, wherein the dilution liquid is recovered from the waste liquid mixture contained in the collection container.

10. The method of claim 9, wherein the measurement unit is flushed with a portion of the diluted sample liquid after the flushing with the first volume of the sample liquid and before the detecting of the measured value of the measurement variable.

11. The method of claim 9, wherein the dilution liquid is recovered from the waste liquid mixture using a membrane method in which the dilution liquid is separated from the waste liquid mixture.

12. The method of claim 9, wherein the dilution liquid is recovered from the waste liquid mixture by condensing vapor obtained from the waste liquid mixture.

13. The method of claim 9, wherein the dilution liquid is recovered from the waste liquid mixture using distillation or fractional distillation of at least a portion of the waste liquid mixture.

14. The method of claim 9, wherein the dilution liquid is substantially free of the at least one analyte.

15. The method of claim 9, wherein the dilution liquid is recovered from the waste liquid mixture includes:

introducing a gas into at least a portion of the waste liquid mixture in the collection container such that the gas is enriched with vapor from the waste liquid mixture;

discharging the gas, enriched with vapor from the waste liquid mixture, from the collection container; and condensing vapor contained in the discharged gas.

16. The method of claim 15, wherein water vapor entrained in the discharged gas is separated from the gas using a membrane dryer and is subsequently condensed.

17. The method of claim 15, wherein the gas is heated prior to being introduced into the waste liquid mixture.

18. The method of claim 15, wherein the waste liquid mixture is heated during the introduction of the gas.

19. The method of claim 9, wherein all steps of the method are performed in an automated manner using a measuring and control electronics of the analysis apparatus.

20. The method of claim 9, wherein the dilution liquid is water.

* * * * *